United States Patent
Buvat et al.

(10) Patent No.: US 6,703,519 B1
(45) Date of Patent: Mar. 9, 2004

(54) POLY (ETHYNYLENE PHENYLENE ETHYNYLENE SILYLENE)S AND METHOD FOR PREPARATION THEREOF

(75) Inventors: Pierrick Buvat, Montbazon (FR); Christian Levassort, Tours (FR); Franck Jousse, Tours (FR)

(73) Assignee: Commissariat a L' Energie Atomique, Paris (FR)

( * ) Notice: Subject to any disclaimer, the term of this patent is extended or adjusted under 35 U.S.C. 154(b) by 0 days.

(21) Appl. No.: 10/088,167
(22) PCT Filed: Sep. 15, 2000
(86) PCT No.: PCT/FR00/02562
§ 371 (c)(1), (2), (4) Date: Mar. 15, 2002
(87) PCT Pub. No.: WO01/19899
PCT Pub. Date: Mar. 22, 2001

(30) Foreign Application Priority Data

Sep. 16, 1999 (FR) .............................. 99 11583

(51) Int. Cl.$^7$ .............................. C07F 7/08
(52) U.S. Cl. ............ 556/431; 556/435; 528/25; 528/31; 528/32; 528/43; 528/481; 528/483
(58) Field of Search ............... 556/431, 435; 528/25, 31, 32, 43, 483, 481

(56) References Cited

FOREIGN PATENT DOCUMENTS

EP 0617073 * 9/1994 .................. 556/431

OTHER PUBLICATIONS

Liu, et al., "Copper (I) chloride catalyzed cross–dehydro-coupling reactions between silanes and ethynyl compounds. A new method for the copolymerization of silanes and alkynes", 6 pages, 1989.

Itoh, et al., A Novel Synthesis and Extremely High Thermal Stability of Poly[{phenylsilylene}–ethynylene–1,3–phenyleneethynylene], 3 pages, 1994.

Corriu, et al., "Synthesis of Poly (alkynylsilanes) having Various Aromatic Groups int he Backbone", vol. 28, 7 pages 1990.

* cited by examiner

*Primary Examiner*—Samuel Barts
(74) *Attorney, Agent, or Firm*—Burns, Doane, Swecker & Mathis, L.L.P.

(57) ABSTRACT

Heat stable poly(ethynylene phenylene ethynylene silylene) polymers with a determined molecular weight bearing at the chain end, groups derived from a chain limiter.

Methods for preparing these polymers, hardened products obtained by heat treatment of these polymers, and matrices for composites comprising these polymers.

23 Claims, 1 Drawing Sheet

Fig. 1

POLY (ETHYNYLENE PHENYLENE ETHYNYLENE SILYLENE)S AND METHOD FOR PREPARATION THEREOF

"This application is a national phase of PCT/FR00/02562 which was filed on Sep. 15, 2000, and was not published in English."

The present invention relates to poly(ethynylene phenylene ethynylene silylene) polymers with a determined molecular weight, to a method for preparing said polymers and to hardened products which may be obtained by a heat treatment of said polymers. The polymers according to the invention may notably be used in matrices for composites.

The technical field of the present invention may be defined as being that of heat stable plastics, i.e. polymers which may withstand high temperatures which may attain up to 600° C., for example.

The industrial needs for such heat stable plastics have enormously increased during the last decades in particular in the field of electronics and aerospace.

Such polymers were developed for finding a remedy to the defects of materials used earlier in similar applications.

Indeed, it is known that metals such as iron, titanium and steel, are thermally very resistant, but they are heavy. Aluminum is light but not very heat resistant i.e. up to about 300° C. Ceramics such as SiC, $Si_3N_4$ and silica are lighter than metals and very heat resistant but not moldable. This is why a large number of plastics have been synthetized which are light, moldable and have good mechanical properties; these are carbon-based polymers essentially.

Polyimides have the highest heat resistance of all plastics with a heat deformation temperature of 460° C., however the compounds which are listed as being the most stable known presently are very difficult to apply. Other polymers such as polybenzimidazoles, polybenzothiazoles and polybenzoxazoles have an even greater heat resistance than that of polyimide, but they are not moldable and they are flammable.

Silicon-based polymers, such as silicones or carbosilanes, have also been investigated extensively. The latter, such as compounds of poly(silylene ethynylene), are generally used as precursors of ceramics of the silicon carbide SiC type, resist compounds and conducting materials.

It was recently shown in document [4] that poly[(phenyl sylylene)[000c] ethynylene-1,3-phenylene ethynylene] (or MSP) prepared by a synthesis method involving a polymerization reaction by dehydrocoupling between phenylsilane and m-diethynylbenzene, exhibited a remarkably high heat stability. This is confirmed in document [1] which generally demonstrates the excellent heat stability properties of poly (silyl ethynylene phenylene ethynylene)s which include a recurrent unit represented by the following formula (A):

(A)

Synthesis of polycarbosilanes including a silane function and diethynylbenzene by conventional methods with metal catalysts leads to low purity polymers containing significant traces of metal catalyst largely detrimental to their thermal properties.

Other enhanced synthesis methods are presented in document [2]: these are syntheses catalyzed by palladium which in fact are only applied to a very limited number of specific polymers wherein silicon bears two phenyl or methyl groups, for example.

In particular, it will be noted that the compounds with the recurrent unit described earlier by formula (A), cannot be synthetized by this method. Now, it is found that the SiH bonds of such compounds, particularly difficult to obtain, are of high interest as they are extremely reactive and may produce multiple rearrangements and reactions.

Another cross dehydrocoupling method for silanes with alkynes in the presence of a catalyst system based on copper chloride and an amine is described in document [3]. This method is however also limited to a few polymers and results in compounds with a partly cross-linked structure and a very high weight average molecular weight ($10^4$–$10^5$). These structural defects seriously affect both the solubility properties and thermal properties of these polymers.

Another synthesis method for overcoming the drawbacks of the method described above, and for preparing pure compounds, without any traces of metals, and with excellent and well-defined properties, notably heat stability, has been suggested in document [4] already mentioned above. This method essentially provides synthesis of compounds of formula (A) above, wherein the silicon atom bears a hydrogen atom. The method according to [4] is a polycondensation with dehydrogenation of a functionalized hydrosilane with a compound of the diethynyl type in the presence of a metal oxide such as MgO according to the following reaction scheme (B):

(B)

This method leads to weakly cross-linked polymers with, as illustrated above, an excellent heat stability, but for which the weight distribution is however very wide.

In another more recent publication [1], the same authors prepared a polymer series including the —Si(H)—C≡C— unit by method (B) and by another more advantageous method, involving the condensation reaction of dichlorosilane and organomagnesium reagents, and subsequently the reaction of the obtained product with a monochlorosilane followed by hydrolysis according to the following reaction scheme (C):

(C)

-continued

Unlike method (B), with method (C) polymers without any structural defects may be obtained in good yields and with a narrow weight distribution.

The compounds obtained by this method are perfectly pure and have perfectly characterized thermal properties. These are cross-linkable thermoplastic polymers.

This document also discloses the preparation of the aforementioned polymers reinforced by glass, carbon or SiC fibers.

A patent relating to polymers comprising the most general recurrent unit (D):

wherein R and R' relate to a large number of known groups in organic chemistry, was granted to the authors of documents [1] and [4], this is document EP-B1-0 617 073 (corresponding to U.S. Pat. No. 5,420,238).

These polymers are essentially prepared by the method of scheme (C) and optionally by the method of scheme (B), and they have an average molecular weight from 500 to 1,000,000. This document also describes hardened products based on these polymers and their preparation by heat treatment. It is shown that the polymers of this document may be used as a heat stable polymer, a fire-resistant polymer, a conducting polymer, a material for electroluminescent and linear components. In fact, it seems that such polymers are essentially used as organic precursors of ceramics.

The excellent heat stability of the polymers, as notably prepared in document EP-B1-0 617 073, enables them to make up the resin forming the organic matrix of heat stable composite materials with organic matrices.

Numerous techniques for producing composites exist.

Very broadly speaking, the different methods require injection techniques, (notably resin transfer molding (RTM)), or techniques for compacting prepregs.

Prepregs are semiproducts, with a small thickness, formed of fibers impregnated with resin. Prepregs which are for making high performance composite structures, contain less than 50% of fiber in volume.

Also, during application, the matrix shall have a low viscosity in order to penetrate the reinforcing sheet and properly impregnate the fiber in order to prevent its distortion and to preserve its integrity. The reinforcement fibers are impregnated either with a resin solution in a suitable solvent, or with pure molten resin, this is the so-called "hot melt" technique. The technology for manufacturing prepregs with a thermoplastic matrix is essentially determined by the morphology of the polymers.

Injection molding is a method which consists of injecting liquid resin in the textile reinforcement positioned beforehand in the cavity formed by the mold and the counter-mold. The most important parameter is viscosity which should be between 100 and 1,000 mPa.s at the injection temperature which is generally from 50 to 250° C.

For these two techniques, viscosity is therefore the critical parameter which conditions the applicability of the polymer.

Now, amorphous polymers correspond to macromolecules with a totally disordered backbone structure. They are characterized by their glass transition temperature (Tg) corresponding to the transition from the glass state to the rubber state. Beyond Tg, thermoplastics are however characterized by significant creep resistance.

The polymers prepared as in document EP-B1-0 617 073 are compounds which exist as a powder. The inventors were able to show, by reproducing the synthesis described in this document that the prepared polymers would have glass transition temperatures close to 50° C.

Below this temperature, the viscosity of the polymer is infinite and beyond this temperature, viscosity decreases as temperature is increased.

However, this drop in viscosity is not sufficient for applying the polymer with conventionally used methods in the world of composites such as RTM and preimpregnation as already described earlier.

Therefore, there is a need for a polymer with a structure analogue to those described in patent EP-B1-0617 073, i.e. having all their advantageous properties, notably heat stability but with sufficiently low viscosity so that they may be applied, handled, "processed" at temperatures from 100 to 120° C. which are the commonly used temperatures in injection or impregnation techniques.

The object of the invention is to provide polymers which i.a. meet these needs, which do not have the defects, drawbacks, limitations and disadvantages of the polymers from the prior art as illustrated in document EP-B1-0 617 073 in particular, and which solve the problems of the prior art.

The object of the invention is further to provide a method for preparing said polymers.

This and other objects are achieved according to the invention by a poly(ethylylene phenylene ethynylene silylene) polymer with a determined molecular weight, wherein said polymer bears at the chain end, groups derived from a chain limiter, said polymer fitting the following formula (I):

or the following formula (Ia):

wherein the phenylene group of the central recurrent unit may be in the o, m or p form, R represents a halogen atom (such as F, Cl, Br and I), (linear, branched or cyclic) alkyl with 1 to 20 carbon atoms (such as methyl, ethyl, propyle, butyl, cyclohexyl), alcoxy with 1 to 20 carbon atoms (such as methoxy, ethoxy, propoxy), aryloxy with 6 to 20 carbon atoms such as phenoxy, substituted phenoxy with 6 to 20 carbon atoms (such as 3,5-dimethylphenoxy), (linear, branched or cyclic) alkenyl with 2 to 20 carbon atoms (such as vinyl, allyl, cyclohexynyl), alkynyl with 2 to 20 carbon atoms (such as ethynyl, propargyl and phenylethynyl), aromatic group with 6 to 20 carbon atoms (such as phenyl, tolyl and mesityl), amino, disubstituted amino with 2 to 20 carbon atoms (such as dimethylamino, diethylamino, ethylmethylamino, methylphenylamino) or silanyl with 1 to 10 silicon atoms (such as silyl, disilanyl ($-Si_2H_5$), dimethylsilyl, trimethylsilyl and tetramethyldisilanyl), wherein one or more hydrogen atoms bound to the carbon atoms of R may be replaced with halogen atoms (such as F, Cl, Br and I), alcoxy (such as methoxy, ethoxy and propoxy), aryloxy (such as phenoxy) substituted phenoxy, amino, disubstituted amino or silanyl; n is an integer from 0 to 4 and q is an integer from 1 to 40; R' and R" which may be identical or different represent a hydrogen atom, an alkyl with 1 to 20 carbon atoms, alkenyl with 2 to 20 carbon atoms, alkynyl with 2 to 20 carbon atoms and an aromatic group with 6 to 20 carbon atoms, wherein one or more of the hydrogen atoms bound to the carbon atoms of R' and R" may be replaced with halogen atoms, alcoxy, aryloxy, phenoxy, substituted phenoxy, amino, disubstituted amino or silanyl groups, examples of these groups have already been mentioned above for R; Y represents a group derived from a chain limiter.

The polymers according to the invention have a structure substantially analog to that of the polymers in document EP-B1-0 617 073, however with the fundamental exception of the presence at the chain end of groups Y derived from a chain limiter.

This structural difference has only little influence on the advantageous properties of these polymers, in particular on the heat stability properties of the polymer which are hardly affected. On the other hand, the presence at the chain end of this group specifically has the effect that the polymer of formula (I) or (Ia), has a determined length and therefore a determined molecular weight, both perfectly defined.

Therefore, this polymer (I) or (Ia) also has perfectly defined and scalable flow properties.

The nature of the Y group depends on the nature of the limiter from which it is derived, Y, in the case of polymers of formula (I), may represent a group of formula (II):

wherein R''' has the same meaning as R and may be identical with or different from the latter and m' has the same meaning as n and may be identical with or different from the latter.

Or else, Y, in the case of polymers of formula (Ia), may represent a group of formula (III):

wherein R', R" and R''' which may be identical or different have the meaning already given above.

A particularly preferred polymer of formula (I) according to the invention, fits the following formula:

wherein q is an integer from 1 to 40 and PH represents phenyl group.

The invention also relates to polymers with a determined molecular weight, which may be obtained by hydrolysis of polymers of formula (Ia), and fitting the following formula (Ib):

wherein R, R', R", n and q have the meaning already given above.

The molecular weight of polymers (I), (Ia) and (Ib) according to the invention is perfectly defined and the length of the polymer and so its molecular weight may be easily controlled by dosed addition of chain limiter in the reaction mixture, reflected by variable proportions of the Y group in the polymer.

Thus, according to the invention, the molar ratio of chain end groups Y with recurrent ethynylene phenylene ethynylene silylene units is generally from 0.01 to 1.5, preferably this ratio is from 0.25 to 1.

Also, according to the invention, the molar proportion of the chain end groups Y is generally from 1 to 60 and preferably from 20 to 50% of the polymer of formula (I) or (Ia).

The number average molecular weight of the polymers (I), (Ia) and (Ib) according to the invention which is perfectly defined, is generally from 400 to 5,000 and the weight average molecular weight is from 600 to 10,000.

These weights are determined by gel permeation chromatography (GPC) from calibration with polystyrene.

According to the invention, the viscosity of the polymers may be perfectly controlled by controlling the molecular weight of the polymers which is generally in the range mentioned above.

Thus, the viscosity of the polymers according to the invention, is in a value range from 0.1 to 1,000 mPa.s, for temperatures from 20 to 160° C., within the weight range mentioned above.

Viscosity also depends on the nature of the groups borne by the aromatic cycles and by silicon. These viscosities which cannot be obtained with polymers from the prior art, are fully compatible with conventional techniques for preparing composites.

According to the invention, it is thus possible to change at will the viscosity of the polymer according to the technological constraints for applying the composite.

Moreover, viscosity is related to the glass transition temperature (Tg). The glass transition temperature of polymers according to the invention will therefore be generally from −50 to +10° C. which is much less than the glass transition temperatures of polymers from the prior art.

The invention further relates to a first method for preparing a poly(ethynylene phenylene ethynylene silylene) polymer with a determined weight bearing at the chain end, groups derived from a chain limiter, said polymer fitting the following formula (I):

(I)

wherein the phenylene group of the central recurrent unit may be in the o, m or p form, and R, R', R", Y, n and q have the meaning already given above.

Said method comprising the reaction of a mixture of a Grignard reagent with general formula (IV):

(IV)

wherein the phenylene group may be in the o, m or p form, and R and n have the meaning indicated above for formula (I), and X represents a halogen atom such as Cl, Br or I, and of a chain limiter with formula:

Y—MgX (V)

X having the meaning already given above, and Y is a group selected from the groups with formula:

(VI)

wherein R''' has the same meaning as R and may be identical with or different from the latter, and n' has the same meaning as n and may be identical with or different from the latter; with a dihalide (dihalosilane) with general formula (VII):

(VII)

wherein R' and R", identical or different, and X have the meaning already indicated above, in the presence of an aprotic solvent, and then a hydrolysis step for obtaining the final polymer of formula (I).

With an alternative of the first method according to the invention, a poly(ethynylene phenylene ethynylene silylene) polymer with formula (Ia) may be prepared:

(Ia)

wherein the phenylene group of the central recurrent unit may be in the o, m, or p form, and R, R', R", Y, q and n have the meanings already given above; said method comprising the reaction of a Grignard reagent with general formula (IV) above, and of the mixture of a chain limiter with formula:

Y—X (VIII)

wherein X has already been defined earlier and Y is selected from the groups with formula:

(IX)

wherein R', R" and R''', identical or different, have the meaning already given above and of a dihalide with general formula (VII) already shown earlier, in the presence of an aprotic solvent, in order to obtain the final polymer with formula (Ia).

The first method of the invention, in this alternative, may further also comprise a final hydrolysis step for obtaining the polymer of formula (Ib) already mentioned above.

The invention also relates to a second method for preparing a poly(ethynylene phenylene ethynylene silylene) polymer with a determined molecular weight, bearing at the chain end, groups derived from a chain limiter, said polymer fitting the following formula (I):

(I)

wherein the phenylene group of the central recurrent unit may be in the o, m or p form, and R, R', R", Y, n and q have the meaning already given above.

Said method comprising the reaction of a mixture of a compound with formula (X):

(X)

wherein the phenylene group may be in the o, m or p form, and R and n have the meaning already given above for formula (I), and of a chain limiter with formula (XI):

(XI)

wherein R'" has the same meaning as R and may be identical with or different from the latter, and n' has the same meaning as n and may be identical with or different from the latter, with a compound of formula (XII):

(XII)

wherein R' and R" which may be identical or different have the meaning already mentioned above, in the presence of a basic metal oxide for obtaining the final compound with formula (I).

With an alternative of the second method according to the invention, a poly(ethynylene phenylene ethynylene silylene) polymer may be prepared with formula (Ia):

(Ia)

wherein the phenylene of the central recurrent unit may be in the o, m or p form, and R, R', R", Y, q and n have the meaning already mentioned above; said method comprising the reaction of a compound with formula (X) already mentioned above, with a mixture of a chain limiter (monohydrosilane) of formula (XIII):

(XIII)

wherein R', R", R'" are identical or different, have the meaning already given above, and a compound with formula (XII) already mentioned above, in the presence of a basic metal oxide for obtaining the final compound with formula (Ia).

The second method of the invention, in this alternative may further comprise a final hydrolysis step to obtain the polymer of formula (Ib) already mentioned above.

According to the invention, and surprisingly, the control of the weights of the polymers of formula (I), (Ia), and (Ib) is obtained by adding to the reaction medium a reactive species also called a chain limiter which will block the polymerization reaction without affecting the global yield of the reaction.

This reactive species is generally an analog of one,of the main reagents, but which only bears a single function providing the coupling. When this species is introduced into the polymer chain, growth is stopped.

By performing dosed additions of chain limiter, according to the invention, the length of the polymer may be easily controlled and consequently, its viscosity. The fundamental principle both of the first method according to the invention and the second method according to the invention, i.e. control of molecular weight and consequently that of the viscosity of the polymer by adding to the reaction mixture a chain limiter, is identical.

The same principle may be applied with slight adaptations to other possible synthesis methods for polymers of formula (I) or (Ia).

Figure 1:
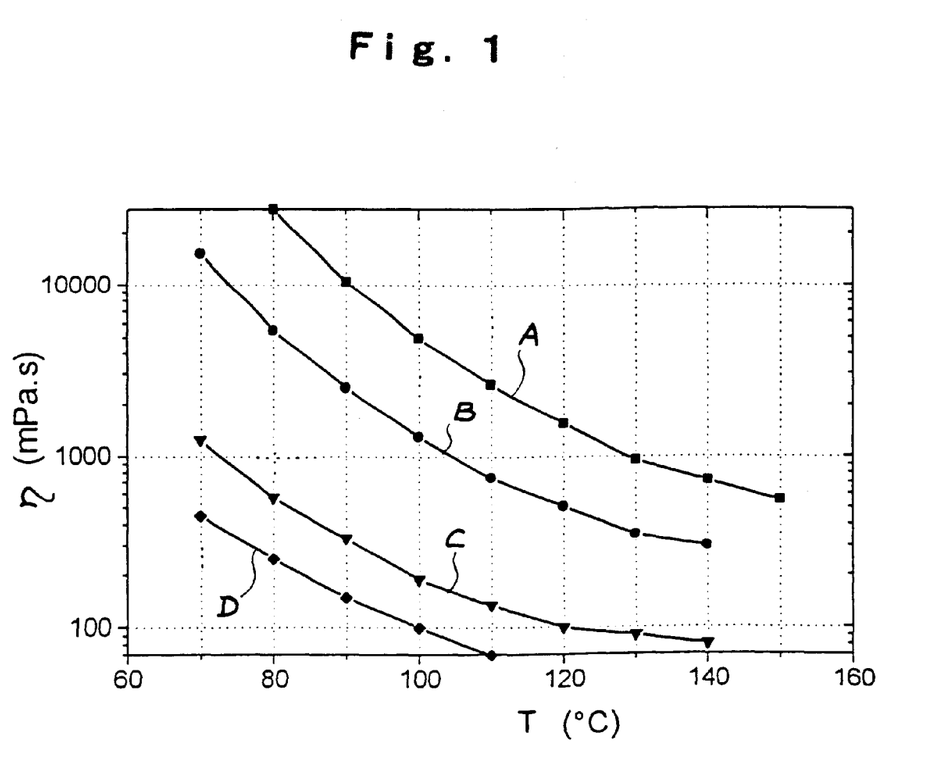
FIG. 1 is a graph on which the viscosity η of the polymers according to the invention (in mPa.s) has been plotted versus the temperature T (in ° C.) for different molar percentages of the chain limiter: 20% (curve A), 30% (curve B), 40% (curve C) and 50% (curve D).

Whether in the first method or in the second method, the length of the polymer and therefore its molecular weight and consequently its viscosity are in direct correlation with the molar percentage of a chain limiter (cf. FIG. 1). This molar percentage is defined by the molar ratio of the chain limiter over the total number of moles of chain limiter and diacetylene compounds of formula (IV) or (X), x 100. This percentage may range from 1 to 60%, preferably from 20 to 50%.

In the literature, in particular in the documents mentioned earlier, there was no indication relating to the control, to the regulation of molecular weights of the poly(silylene ethynylene) type polymers and in prior art documents there was a fortiori no mention of any relationship relating the distribution of the molecular weights with the viscosities of these polymers.

Thus, consequently, the fact of deciding to introduce a chain limiter in the polymer synthesis mixture in order to control molecular weight is neither disclosed nor suggested in the prior art.

In the case of the synthesis method involving a metal oxide such as described in documents [1], [4] and in patent EP-B1-0 617 073 and which substantially corresponds to the second preparation method according to the invention, the molecular weight is related to the activation level of the catalyst [4]. As the latter is very hygroscopic, it is very difficult to predict the molecular weights a priori. The less the catalyst is activated, the lower the weights, but this drop is accompanied by a significant drop in the yield of the polymerization reaction. Moreover, the distribution may prove to be so wide that several different weight fractions may be isolated by selective fractionating.

In the case of the synthesis with a magnesium scheme as described in document [1] and of the aforementioned patent, and which substantially corresponds to the first preparation method according to the invention, it is very obvious that the molecular weights are determined by the nature and the amount of solvent as well as by the reaction temperature. However, it is very delicate to optimize these parameters and they do not provide significant variation of the range of weights. Moreover, the drop in weights is inevitably accompanied by a significant drop in the yield of the reaction. Finally, the weight distribution is also influenced by the stoichiometry of the reaction. In the case of synthesis with a magnesium scheme, this parameter will only be relevant if one of the two reagents is in very large excess, which consequently will strongly limit the yield.

According to the invention, and surprisingly, none of the synthesis parameters mentioned above is acted upon and a completely different synthesis strategy is adopted by using in the reaction medium, a reactive species which will block the polymerization reaction without affecting the global yield of the reaction.

In addition, with the first preparation method of the invention, it is possible to suppress one step of the method of EP-B1-0 617 073 which involves a monohalogenated silyl compound which induces shorter reaction times as well as substantial reagent savings.

The invention also relates to the hardened product which may be obtained by heat treatment at a temperature of 50 to 700° C. of the polymer described above.

This hardened product generally has, according to the invention, a number average molecular weight from 400 to 5,000 and a weight average molecular weight from 600 to 10,000.

Finally, the invention also relates to a matrix for a composite comprising the polymer described earlier. The invention will be better understood upon reading the detailed description which follows, given as illustrative and non-limiting with reference to the appended drawing wherein:

In detail, the first method for preparing a poly(ethynylene phenylene ethynylene silylene) polymer according to the invention, is substantially analog to the one described in document EP-B1-0 617 073, however, except for the incorporation in this mixture according to the invention of a chain limiter, the final treatment of the polymers and possibly the molar ratio of the organomagnesium reagents and dichlorosilane. As regards the conditions of this method, reference may therefore be made to document EP-B1-0 617 073 which is incorporated as reference herein.

The Grignard reagents of formula (IV) involved in the first preparation method according to the invention are notably those described in document EP-B1-0 617 073 on pages 5–7 (formulae (3) and (8)–(20)).

The chain limiter of formula (V) may be a monoacetylenic organomagnesium compound with formula:

R''', X and n' have already been defined above.

Examples of the monohalosilane are given in patent EP-B1-0 617 073, on page 9 (formula (5)).

Examples of the monoacetylenic compounds from which are derived the monoacetylenic organomagnesium compounds (V) are the following: phenylacetylene, 4-ethynyltoluene 4-ethynylbiphenyl, 1-ethynyl 4-methoxybenzene.

The mixture formed by the Grignard reagent (IV) and the chain limiter compound fitting the above formula is reacted with dihalosilane of general formula (VII).

Examples of such dihalosilanes are the dichlorosilanes described on pages 7–9 of patent EP-B1-0 617 093 and notably fitting formulae (21)–(26) given in this document. However, it should be noted that according to the invention, one of the substituents of these dihalosilanes is not necessarily H as in the aforementioned patent.

The polymerization reaction conditions such as the solvent, the duration of the reaction, the temperature, etc. (excluding the "post-treatment") are substantially the same as those described in document EP-B1-0 617 073 to which reference is made, in particular to page 40. The only differences in this actual polymerization step concern the addition of a further chain limiter reagent. Moreover, the reaction conditions are substantially the same.

However, and according to the invention, preferably, the ratio of the number of acetylenic functions to the number of halogen functions borne by the silane should be as close as possible to 1, and preferably from 0.9 to 1.1. The molar ratio of phenylacetylene to diethynylbenzene is preferably between 0.01 and 1.5 and ideally between 0.25 and (percentage from 1 to 60%).

This also applies to the case of the alternative of the first method wherein the chain limiter is a monohalosilane.

According to the invention, after the polymerization reaction, a final hydrolysis step is performed, so one step is suppressed as compared with the analogous method of the prior art, in particular in the case when the chain limiter is an organomagnesium compound.

Indeed, in document EP-B1-0 617 073, a post-treatment of the already prepared polymer is performed, the molecular weight of which is fixed by a monohalosilane and then by hydrolysis. It should be noted that in this case, the monohalosilane does not play the role of a chain limiter because it is not included, unlike the present invention, in the initial reaction mixture and its action has no influence on the molecular weight of the polymer.

According to the invention, at the end of the reaction, the polymer is hydrolyzed with a volume of, for example, 0.1 to 50 ml per gram of polymer of an acid solution, for example about 0.01 to 10 N of hydrochloric acid or sulfuric acid.

The ideal solvent is tetrahydrofurane. In this case, the reaction mixture is then decanted and the solvent of the organic phase is substituted with a volume of for example 0.1 to 100 ml per gram of polymer, and ideally 1 to 10 ml per gram of polymer for any type of solvent immiscible with water, such as xylene, toluene, benzene, chloroform, dichloromethane, or an alkane with more than 5 carbon atoms. In the case of a reaction conducted in a solvent immiscible with water, this step may be suppressed. The organic phase is then washed for example 1 to 5 times and preferably 2 to 3 times with a water volume for example of 0.1 to 100 ml per gram of polymer, and ideally from 1 to 10 ml per gram of polymer, in order to neutralize the organic phase and to extract therefrom all the impurities such as magnesium and halogen salts. The pH of the organic phase should preferably be between 5 and 8 and ideally between 6.5 and 7.5. After evaporation of the solvent, the polymer is dried in vacuo between 0.1 and 500 mbars at a temperature between 20 and 150° C. for a period of time between 15 minutes and 24 hours.

The second method for preparing the polymers of formula (I) is a method requiring dehydrogenation in the presence of a basic metal oxide.

Such a method only differs from the analogous method described in documents [1] and [4] as well as in document EP-B1-0 617 073, by the fact that a chain limiter is added to the reaction mixture. The reaction mixture comprises a compound with formula (X) for example: 1,3-diethynylbenzene and a chain limiter, which, in this second method, is a monoacetylenic compound (XI) analogous to the one already described earlier for the first method.

The mixture of the compounds (IX) and of the chain limiter reacts with a dihydrosilane of formula (XII).

The basic metal oxide used is preferably selected from the oxides of the alkali, alkaline earth metals, the oxides of lanthanides, the oxides of scandium, yttrium, thorium, titanium, zirconium, hafnium, copper, zinc, cadmium and mixtures thereof.

Examples of such oxides are given in document EP-B1-0 617 073 on pages 16 and 17, to which reference will explicitly be made herein. These oxides may be subject to an activation treatment such as described in patent EP-B1-0 617 073.

The hardened products prepared by heat treatment of the polymers according to the invention are for example produced by melting this polymer or dissolving it in an adequate solvent, and then by putting it, if necessary, in the desired form and then heating it in a gas atmosphere of air, nitrogen or an inert gas such as argon or helium.

The treatment temperature generally ranges from 50 to 700° C., preferably from 100 to 400° C., and still preferably from 150 to 350° C., and heating is generally performed for a period of one minute to a 100 hours.

The hardening reaction may optionally be conducted in the presence of a hardener and the polymer according to the invention may also be mixed with other resins or polymers.

Because of the analogous structure of the polymers according to the invention and of the polymers of document EP-B1-0 617 073, their hardening process is substantially the same and reference may be made to this document page 17, for more details.

The preparation of composites with an organic matrix comprising the polymer of the invention, is detailed hereafter:

The invention will now be described with reference to the following examples given as illustrative and non-limiting:

EXAMPLE 1

Preparation of Poly(diphenylsilylene Ethynylene Phenylene Ethynylene) With a Chain Termination of the Aromatic Acetylene Type With 20 Molar Percent of Chain Limiter 25.88 g (257 mmol) of bromoethane in solution in 100 ml of anhydrous THF are introduced dropwise into a 1 liter three-necked flask placed under argon and containing 6.4 g (263 mmol) of magnesium powder suspended in 100 ml of anhydrous THF, in order to maintain the reflux.

Reflux is maintained for one hour after the end of the addition. A mixture of 12.67 g (100.6 mmol) of 1,3-diethynylbenzene and 2.56 g (25.1 mmol) of phenylacetylene in solution in 100 ml of anhydrous THF is then introduced, dropwise, left with stirring and with reflux for one hour. 28.6 g (113 mmol) of dichlorodiphenylsilane in solution in 100 ml of anhydrous THF are then introduced, dropwise with reflux. The solution is then left with stirring and refluxed for one hour. The polymer thereby formed is then hydrolyzed by adding 50 ml of 35% bulk hydrochloric acid in solution in 100 ml of water. The reaction medium is separated into two fractions, one aqueous, the other organic. The aqueous phase is then subjected to a change of solvent, THF being replaced with 200 ml of chloroform. The polymer in solution in chloroform is then washed three times with 100 ml of water. The organic solution is then dehydrated by having it pass over a bed of magnesium sulfate. The polymer is then obtained by evaporating off the solvent. The polymer is finally purified by drying under 0.4 mbar at 20° C. 28.5 g (80% yield) of polymer is thus obtained, as a yellow oil.

The number average molecular weight of this compound is 1,515 for a weight average weight of 3,257 (polydispersity of 2.15). These weights were determined by GPC from a calibration with polystyrene.

The viscosity of this polymer is 950 mPa.s at 130° C., 720 mPa.s at 140° C. and 550 mPa.s at 150° C.

EXAMPLE 2

Preparation of Poly(diphenylsilylene Ethynylene Phenylene Ethynylene) With a Chain Termination of the Aromatic Acetylene Type With 30 Molar Percent of Chain Limiter The operating conditions are the same as those in experiment No.1, except for the acetylenic amounts, which are 11.72 g (93.05 mmol) and 3.91 g (39.88 mmol) respectively for diethynylbenzene and phenylacetylene. 27.5 g (77% yield) of polymer are thus obtained, as a yellow oil.

The number average molecular weight of this compound is 1,297 for a weight average weight of 2,303 (polydispersity of 1.77). These weights were determined by GPC from a calibration with polystyrene.

The viscosity of this polymer is 750 mPa.s at 110° C., 510 mPa.s at 120° C., 350 mPa.s at 130° C. and 300 mPa.s at 140° C.

EXAMPLE 3

Preparation of Poly(diphenylsilylene Ethynylene Phenylene Ethynylene) With a Chain Termination of the Aromatic Acetylene Type With 40 Molar Percent of Chain Limiter The operating conditions are the same as those in experiment No.1, except for the acetylenic amounts, which are 10.68 g (84.75 mmol) and 5.76 g (56.5 mmol) respectively for diethynylbenzene and phenylacetylene. 29.5 g (83% yield) of polymer are thus obtained, as a yellow oil.

The number average molecular weight of this compound is 1,070 for a weight average weight of 1,900 (polydispersity of 1.78). These weights were determined by GPC from a calibration with polystyrene.

The viscosity of this polymer is 570 mPa.s at 80° C., 330 mPa.s at 90° C., 190 mPa.s at 100° C. and 135 mPa.s at 110° C. et 100 mPa.s at 120° C., 90 mPa.s at 130° C. and 80 mPa.s at 140° C.

EXAMPLE 4

Preparation of Poly(diphenylsilylene Ethynylene Phenylene Ethynylene) With a Chain Termination of the Aromatic Acetylene Type With 50 Molar Percent of Chain Limiter The operating conditions are the same as those in experiment No.1, except for the acetylenic amounts, which are 9.49 g (75.33 mmol) and 7.68 g (75.33 mmol) respectively for diethynylbenzene and phenylacetylene. 28 g (79% yield) of polymer are thus obtained, as a yellow oil.

The number average molecular weight of this compound is 878 for a weight average weight of 1,470 (polydispersity of 1.67). These weights were determined by GPC from a calibration with polystyrene.

The viscosity of this polymer is 450 mPa.s at 70° C., 250 mPa.s at 80° C., 150 mPa.s at 90° C., 100 mPa.s at 100° C., and 70 mPa.s at 110° C.

From the results of Examples 1 to 4, it is possible to establish a correlation between the chain limiter level and the viscosity of the polymer. In FIG. 1, the viscosity η (in mPa.s) has been plotted versus temperature T (in ° C.) for the poly(diphenylsilylene ethynylene phenylene ethynylene) according to the invention, with a chain termination of the aromatic acetylene type prepared by the method according to the invention in accordance with Examples 1 to 4 with different chain limiter levels. Curves A, B, C and D refer to chain limiter levels of 20%, 30%, 40% and 50% in moles, respectively.

EXAMPLE 5

Synthesis From a Metal Oxide According to the Second Preparation Method According to the Invention, of Poly(diphenylsilylene Ethynylene Phenylene Ethynylene) With a Chain Termination of the Aromatic Acetylene Type With 20 Molar Percent of Chain Limiter.

A mixture of 12.67 g (100.6 mmol) of 1,3-diethynylbenzene, 2.56 g (25.1 mmol) of phenylacetylene, and 20.6 g (73 mmol) of diphenylsilane in solution in 100 ml of anhydrous toluene is dropwise introduced into a 1 liter three-necked flask placed under argon and containing 20 g (0.5 mmol) of magnesium oxide as a powder suspended in 100 ml of anhydrous toluene, is left with stirring at 30° C. for 2 hours, and then at 40° C. for 1 hour, and then at 50° C. for 1 hour, and then at 60° C. for 1 hour, then at 80° C. for 1 hour. The solution is then filtered, and the solvent is evaporated off. 27.5 g (80% yield) of a polymer is then collected, as an oil.

The number average molecular weight of this compound is 1.312 for a weight average weight of 3.827 (polydispersity of 2.91). These weights were determined by GPC from a calibration with polystyrene.

The viscosity of this polymer is 1.050 mPa.s at 130° C. and 650 mPa.s at 150° C.

EXAMPLE 6

Preparation of a Carbon/poly(diphenyl-silylene Ethynylene Phenylene Ethynylene) Composite The poly(diphenylsilylene ethynylene phenylene ethynylene) used is that of Example 3.

The composite is obtained with impregnation at 130° C. of a stack of 30 carbon tissue plies. The sandwich thereby formed is placed in an oven under a pressure of 2 bars for cross-linking.

The cycle used is the following: from 130 to 250° C. at a rate of 10° C./min, and then 30 mins at 250° C., and then from 250 to 25° C. at a rate of 10° C./min. A hardened composite of density 1.5 is then obtained.

REFERENCES

[1] <<New Highly Heat-Resistant Polymers containing Silicon: Poly(silylene ethynylene phenylene ethynylene)s>> by ITOH M., INOUE K., IWATA K., MITSUZUKA M. and KAKIGANO T., Macromolecules, 1997, 30, pp. 694–701.

[2] CORRIU Robert J. P. et al., Journal of polymer science: Part C : Polymer Letters, 1990, 28, pp. 431–437.

[3] << Copper (I) chloride catalyzed cross dehydrocoupling reactions between silanes and ethynyl compounds. A new method for the copolymerization of silanes and alkynes>> par Liu H. Q.; HARROD J. F. The Canadian Journal of Chemistry, 1990, vol. 68, pp. 1100–1105.

[4] << A novel synthesis and extremely high thermal stability of Poly[(phenylsilylene)-(ethynylene-1,3-phenylene ethynylene) ] >> par ITOH M., INOUE K., IWATA K., MITSUZUKA M., KAKIGANO T.; Macromolecules, 1994, 27, pp. 7917–7919.

What is claimed is:

1. A poly(ethynylene phenylene ethynylene silylene) polymer with a determined molecular weight, wherein said polymer bears at the chain end, groups derived from a chain limiter, said polymer fitting the following formula (I):

or the following formula (Ia):

wherein the phenylene group of the central recurrent unit may be in the o, m or p form, R is a halogen atom selected from the group consisting of F, Cl, Br and I; linear alkyl, branched alkyl, cyclic alkyl with 1 to 20 carbon atoms, selected from the group consisting of methyl, ethyl, propyl, butyl, and cyclohexyl; alkoxy with 1 to 20 carbon atoms selected from the group consisting of methoxy, ethoxy, and propoxy; aryloxy with 6 to 20 carbons atoms; linear alkenyl, branched alkenyl, cyclic alkenyl with 2 to 20 carbon atoms selected from the group consisting of vinyl, allyl, and cyclohexenyl; alkynyl, with 2 to 20 carbon atoms selected from the group consisting of phenyl, tolyl and mesityl; amino; disubstituted amino selected from the group consisting of ethylmethylamino, methylphenylamino; or a silanyl group with 1 to 10 silicon atoms selected from the group consisting of silyl, disilanyl, and disilanyl optionally sub- stituted with halogen atoms selected from the group consisting of F, Cl, Br and I, alkoxy groups, substituted phenoxy, amino, disubstituted amino or silanyl groups; n is an integer from 0 to 4; q is an integer from 1 to 40; R' and R" which may be identical or different are a hydrogen atom, alkyl with 1 to 20 carbon atoms, alkenyl with 2 to 20 carbon atoms, alkynyl with 2 to 20 carbon atoms, and an aromatic group with 6 to 20 carbon atoms, wherein one or more of the hydrogen atoms bound to the carbon atoms of R' ad R" may be replaced with halogen atoms, alkoxy, aryloxy, phenoxy, substituted phenoxy, amino, disubstituted amino or silanyl groups; Y represents a group derived from a chain limiter.

2. The polymer of formula (I) according to claim 1, wherein Y represents a group of formula (II):

(II)

wherein R''' has the same meaning as R and may be identical with or different from the latter and n' has the same meaning as n and may be identical with or different from the latter.

3. The polymer of formula (Ia) according to claim 1, wherein Y represents a group with formula (III):

(III)

wherein R', R" and R''' which may be identical or different have the meaning already given in claim 1.

4. The polymer according to claim 1 fitting the following formula:

wherein q is an integer from 1 to 40 and PH represents a phenyl group.

5. The polymer with a determined molecular weight according to claim 1, which may be obtained by hydrolysis of a polymer of formula (Ia) and fitting the following formula (Ib):

(Ib)

wherein R, R', R", n and q have the meaning already given in claim 1.

6. The polymer according to claim 1, wherein the molar ratio of the chain end Y groups to the ethylnylenephenylene ethynylene silylene recurrent units is from 0.01 to 1.5, preferably from 0.25 to 1.

7. The polymer according to claim 1, wherein the molar proportion of the Y chain end groups is from 1 to 60%, preferably from 20 to 50%.

8. The polymer according to claim 1, with a number average molecular weight from 400 to 5,000.

9. The polymer according to claim 1, with a weight average molecular weight from 600 to 10,000.

10. The polymer according to claim 1, with a viscosity from 0.1 to 1,000 mPa.s.

11. The polymer according to claim 1, with a glass transition temperature Tg from −150 to +10° C.

12. A method for preparing a poly(ethynylene phenylene ethynylene silylene) polymer with a determined molecular weight bearing at the chain end, groups derived from a chain limiter, said polymer fitting formula (I) of claim 1:

(I)

said method comprising the reaction of a mixture, of a Grignard reagent with general-formula (IV):

(IV)

wherein the phenylene group may be in the o, m or p form and R and n have the meaning already given in claim 1 for formula (I) and X represents a halogen atom such as Cl, Br or I, and of a chain limiter with formula:

Y—MgX (V)

X having the meaning already given above, and Y is a group selected from groups with formula:

(VI)

wherein R''' has the same meaning as R and may be identical with or different from the latter and n' has the same meaning as n may be identical with or different from the latter;

with a dihalide of general formula (VII):

(VII)

wherein R' and R" are identical or different and have the meaning already given in claim 1 and X has the meaning already indicated above, in the presence of an aprotic solvent, and an hydrolysis step for obtaining the final polymer of formula (I).

13. A method for preparing a poly(ethynylene phenylene ethynylene silylene) polymer with a determined molecular weight bearing at the chain end, groups derived from a chain limiter, said polymer fitting formula (Ia) of claim 1:

(Ia)

said method comprising the reaction of a Grignard reagent with general formula (IV)

(IV)

wherein the phenylene group may be in the o, m or p form and X represents a halogen atom such as Cl, Br or I and of the mixture of a chain limiter with formula:

Y—X  (VIII)

wherein X represents a halogen atom such as Cl, Br or I and Y is selected from groups with formula:

(IX)

wherein R', R" and R''' are identical or different and have the meaning already given in claim 1, and of a dihalide with general formula (VII), in the presence of an aprotic solvent, for obtaining the final polymer with formula (Ia).

14. The method according to claim 13, further comprising a final hydrolysis step, as a result of which the polymer of formula (Ib).

(Ib)

wherein n is an integer from 0 to 4 and q is an integer from 1 to 40.

15. A method for preparing a poly(ethynylene phenylene ethynylene silylene) polymer with a determined molecular weight bearing at the chain end, groups derived from a chain limiter, said polymer fitting formula (I) of claim 1:

(I)

said method comprising the reaction of a mixture of a compound with formula (X):

(X)

wherein the phenylene group may be in the o, m, or p form, and R and n have the meaning already given in claim 1 for formula (I), and a chain limiter with formula (XI):

(XI)

wherein R''' has the same meaning as R and may be identical with or different from the latter, and n' has the same meaning as n and may be identical with or different from the latter, with a compound of formula (XII):

(XII)

wherein R' and R" which may be identical or different have the meaning already given in claim 1, in the presence of a basic metal oxide in order to obtain the final compound of formula (I).

16. A method for preparing a poly(ethynylene phenylene ethynylene silylene) polymer with a determined molecular weight, bearing at the chain end, groups derived from a chain limiter, said polymer fitting formula (Ia) of claim 1:

(Ia)

said method comprising the reaction of a compound with formula (X)

(XIII)

wherein the phenylene group may be in the o, m, or p form, and R and n have the meaning already given in claim 1 for formula (I), with a mixture of a chain limiter (monohydrosilane) with formula (XIII):

(X)

wherein R', R", R'" are identical or different and have the meaning already given in claim 1 and of a compound with formula (XII) already defined in claim 15, in the presence of a basic metal oxide in order to obtain the final compound with formula (Ia).

17. The method according to claim 16, further comprising a hydrolysis final step, as a result of which the polymer of formula (Ib) R represents a halogen atom such as F, Cl, Br and.I, alkyl with 1 to 20 carbon atoms, alcoxy with 1 to 20 carbon atoms, aryloxy with 6 to 20 carbon atoms, substituted phenoxy with 6 to 20 carbon atoms, alkenyl with 2 to 20 carbon atoms, alkynyl, with 2 to 20 carbon atoms, an aromatic group with 6 to 20 carbon atoms, amino, disubstituted amino with 2 to 20 carbon atoms, or a silanyl group with 1 to 10 silicon atoms, wherein one or more hydrogen atoms bound to carbon atoms from R may be replaced with halogen atoms, alcoxy groups, aryloxy substituted phenoxy, amino, disubstituted amino or silanyl groups; n is an integer from 0 to 4 and q is an integer from 1 to 40; R' and R" which may be identical or different represent a hydrogen atom, alkyl with 1 to 20 carbon atoms, alkenyl with 2 to 20 carbon atoms, alkynyl with 2 to 20 carbon atoms, and an aromatic group with 6 to 20 carbon atoms, wherein one or more of the hydrogen atoms bound to the carbon atoms of R' and R" may be replaced with halogen atoms, alcoxy, aryloxy, phenoxy, substituted phenoxy, amino, disubstituted amino or silanyl groups, Y represents a group derived from a chain limiter is obtained.

18. The method according to claim 12, wherein the molar percentage of the chain limiter in the mixture of diacetylenic compounds with formula (IV) or (X) and of chain limiter is from 1 to 60%, preferably from 20 to 50%.

19. A hardened product which may be obtained by a heat treatment at a temperature from 50 to 700 degrees C., of the polymer according to claim 1.

20. The hardened product according to claim 19 with a number average molecular weight from 400 to 5,000.

21. The hardened product according to claim 1 with a weight average molecular weight from 600 to 10,000.

22. A matrix for a composite comprising the polymer according to claim 1.

23. The method according to claim 15, wherein the molar percentage of the chain limiter in the mixture of diacetylenic compounds with formula (IV) or (X) and of chain limiter is from 1 to 60%, preferably from 20 to 50%.

* * * * *